Nov. 21, 1933.  H. H. McKEE  1,936,170
BRANDING DEVICE
Original Filed April 12, 1930
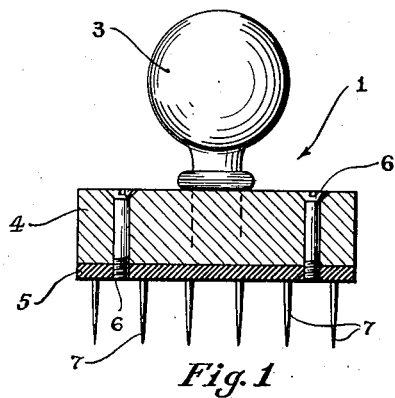
Fig. 1
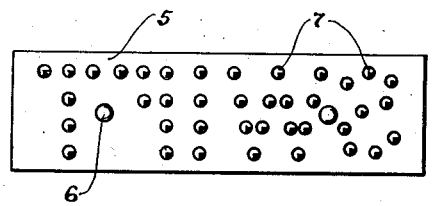
Fig. 3
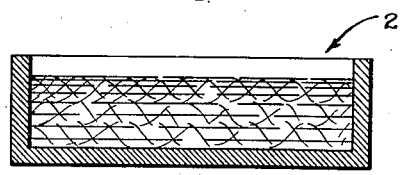
Fig. 2
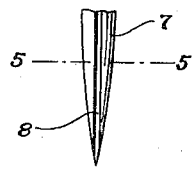
Fig. 4
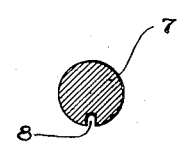
Fig. 5   Fig. 6
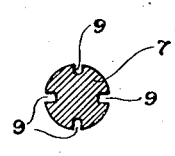
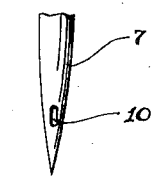
Fig. 7
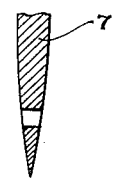
Fig. 8
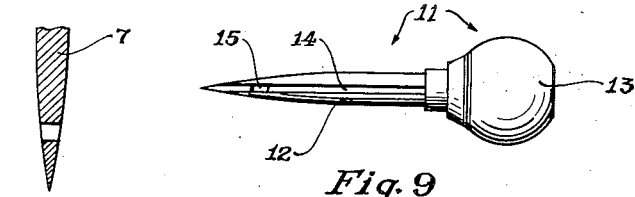
Fig. 9
Harry H. McKee
INVENTOR
WITNESS.
Wm C. Meiser.
BY
ATTORNEY Patented Nov. 21, 1933

1,936,170

UNITED STATES PATENT OFFICE 1,936,170

BRANDING DEVICE

Harry H. McKee, Chicago, Ill., assignor to Swift and Company, Chicago, Ill., a corporation of Illinois Original application April 12, 1930, Serial No. 443,765. Divided and this application August 3, 1931. Serial No. 554,610

2 Claims. (Cl. 101—30)

This invention relates to the meat branding art and especially to means for sub-surface pigmentation exemplified by applicant's co-pending application, Serial No. 208,668 filed July 27, 1927, and Serial No. 289,292 filed June 29, 1928, and particularly to means adaptable for use in connection with those meats such as lamb which have a tough parchment-like membrane of fine tissue, known as fell.

The present application is a device of applicant's co-pending application entitled "Method and means for marking meat", Serial No. 443,765, filed April 12, 1930.

When plain needles are used for sub-surface pigmentation or tatoo branding of fell covered meats or carcasses such as lamb, the membrane to which reference has been made tends to wipe off and remove the ink from the needles as they enter the surface of the meat; consequently, tending to exclude the pigment and prevent effective marking as a result of which the subsequent removal of the fell removes from the carcass or carcass part, the pigment which adheres to the fell and leaves an unsatisfactory brand on the meat.

One of the objects of this invention is to provide a means for proper and efficient sub-surface branding of meats of the type to which reference has been made.

Another object of this invention is to provide a means to make a permanent mark which shall be clearly legible even after the fell membrane of skin has been removed.

Other objects of this invention will be apparent in the description and inherent in the claims which follow. Certain specific embodiments of this invention are illustrated in the accompanying drawing.

Figure 1 is a view of a hand manipulated branding tool mainly in longitudinal section.

Figure 2 is a corresponding sectional view of an ink box or pad which may be used in connection with said tool.

Figure 3 is a plan view of the branding side of said tool, being the bottom side as viewed in Figure 1.

Figure 4 is a greatly enlarged or magnified fragmentary view showing the longitudinal slot tip part of a needle such as is used in the devices of Figure 1.

Figure 5 is a cross section on the line 5—5 of Figure 4.

Figure 6 is a cross-section, also much enlarged, of a modified form of needle having a plurality of longitudinal ink grooves.

Figure 7 shows a further modification in which a plain needle is provided with a simple ink recess adjacent to its tip.

Figure 8 is a longitudinal axial section of a further modification of a needle having a perforation adjacent to its tip.

Figure 9 represents a simplified modification of a variant form of hand tool embodying one embodiment of this invention. The device of the present invention may be used in the methods described and claimed in my co-pending application, Serial No. 443,765, filed April 12, 1930.

Referring more in detail to the drawing:

The branding tool 1 is used with any convenient ink supply, as for instance, an ink box or pad 2, said tool comprising a handle 3, a body block 4, which may be of wood, a face plate 5 which may be of metal and held by screws 6 and a group of needles 7, arranged according to a chosen brand.

In using this particular embodiment, the operator grasps the handle 3 and applies the needles 7 to a source of ink, as for instance, an ink box 2, and then applies the brand directly to the meat or carcass, applying only sufficient force to thrust the points of the needles well below the fell or other surface covering. It is to be understood that the needles of the hand tool shown in Figure 1 are all recessed or apertured adjacent to their tips, or otherwise roughened in some suitable way in order to carry ink into the outer part of the meat just beneath the fell or other surface covering. This feature of the needles is illustrated by the enlarged views Figures 4 to 9 inclusive.

More in detail, and referring first to Figures 4 and 5, the form of needle 7 here shown, is provided with a longitudinal surface groove 8 extending from adjacent to the tip, well back and at least somewhat beyond the depth of penetration required for branding.

In Figure 6 the needle 7 is shown provided with four grooves 9 instead of one in order to more assuredly deposit an adequate amount of ink and also to produce a somewhat larger dot which may show an appreciably distinctive, quadruplex form.

Referring to Figure 7, the needle 7 here shown is provided with a small indentation, recess, or pocket adjacent to the tip for carrying a charge of ink to deposit beneath the meat surface.

Figure 8 shows a needle 7 having a transverse perforation 10 adjacent to its tip to assuredly carry a distinct charge of ink beneath the surface of carcass to be branded.

Referring to the simplified tool embodiment of Figure 9, this device 11 comprises a needle 12 having a handle 13, the needle having a longitudinal groove 14 and a hole or eye 15 adjacent to its tip. In using this punch or awl-like tool, the brand may be formed one dot at a time. This particular form of tool, while readily lending itself to the application of brand designs is, of course, not suitable for mass production except in very special instances. The resultant dots vary somewhat in detail according to the kind of needle as illustrated by Figures 4, 5, 6, 7, and 8, so that a single needle mark may, in some cases, be made to identify the meat.

This invention, being variously illustrated, it is to be understood that some of the details may be altered or omitted without departing from the spirit of the invention as defined in the following claims.

I claim:

1. A branding instrument comprising a plurality of needles arranged according to a chosen design of brand mark and a support therefor, said needles being each provided with grooves and each having deeply recessed apertures adjacent their points terminating in said grooves, whereby to carry ink through a layer of fell.

2. A branding needle for use in the branding of raw meat having a tough parchment-like exterior membrane of fine tissue, known as fell, said branding needle having a longitudinally extending needle shaped body portion terminating in a pointed forward end, which said body portion has a longitudinally extending grooved portion that extends rearwardly from the pointed end, which body portion also has adjacent the pointed end a transversely extending recessed portion that extends from the bottom of said longitudinal grooved portion still further into the body of the branding needle than does said longitudinal grooved portion whereby there is provided an assured supply of ink for depositing in the meat on the inside of the fell, in addition to that supply of ink carried by said longitudinally extending grooved portion, which branding member when in use is first supplied with ink and is thereafter forced into the meat through said fell until the transversely extending recessed portion has passed through and beyond said fell.

HARRY H. McKEE.